United States Patent
Tung et al.

(10) Patent No.: US 10,754,066 B2
(45) Date of Patent: Aug. 25, 2020

(54) ELECTRONIC DEVICE WITH LOW REFLECTANCE AND COLOR MATCHED DISPLAY BORDER

(71) Applicant: Apple Inc., Cupertino, CA (US)

(72) Inventors: Chun-Hao Tung, San Jose, CA (US); Qian Zhao, Santa Clara, CA (US); Sunggu Kang, San Jose, CA (US); John Z. Zhong, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 838 days.

(21) Appl. No.: 14/884,677

(22) Filed: Oct. 15, 2015

(65) Prior Publication Data

US 2017/0059746 A1    Mar. 2, 2017

Related U.S. Application Data

(60) Provisional application No. 62/209,023, filed on Aug. 24, 2015.

(51) Int. Cl.
*G02B 1/115*    (2015.01)
*G06F 3/044*    (2006.01)
(Continued)

(52) U.S. Cl.
CPC .............. *G02B 1/115* (2013.01); *G02B 5/003* (2013.01); *G06F 3/044* (2013.01); *G02F 1/133512* (2013.01); *G02F 2001/133388* (2013.01)

(58) Field of Classification Search
CPC .. G02B 1/11; G02B 1/115; G02B 1/16; G02B 2207/107; G02B 5/201; G06F 1/1605; G06F 1/1637; G06F 1/1686; G06F 3/041; G06F 3/0412; G06F 3/044; G06F 3/045; G06F 2203/04107; G06F 2203/04111; G02F 1/1333; G02F 1/13338; G02F 1/133502; G02F 1/133305; G02F 1/133308; G02F 1/133512;
(Continued)

(56) References Cited

U.S. PATENT DOCUMENTS 8,390,918 B2    3/2013    Wilcox et al.
8,746,902 B2    6/2014    Patel et al.
(Continued)

*Primary Examiner* — Thomas K Pham
*Assistant Examiner* — Ibrahima Diedhiou
(74) *Attorney, Agent, or Firm* — Treyz Law Group, P.C.; G. Victor Treyz; Joseph F. Guihan

(57) ABSTRACT

A display may have an active area in which pixels display images through a transparent display layer. An opaque masking material may be formed in an inactive border area adjacent to the active area. The opaque masking layer may include particles such as carbon black particles to provide the opaque masking layer with a dark appearance. The color of the opaque masking layer may be adjusted by incorporating additional particles such as titanium oxide particles. Particle size for the carbon black particles and the index of refraction of the opaque masking layer may be adjusted to reduce reflectance in the inactive border area. A transparent conductive layer may be supported by the transparent display layer. Index-of-refraction matching layers may be interposed between the transparent conductive layer and the transparent display layer. The opaque masking layer may be interposed between the matching layers in the inactive border area.

20 Claims, 6 Drawing Sheets

(51) Int. Cl.
*G02B 5/00* (2006.01)
*G02F 1/1333* (2006.01)
*G02F 1/1335* (2006.01)

(58) Field of Classification Search
CPC ......... G02F 1/133514; G02F 1/134363; G02F 2001/133331; G02F 2001/133334; G02F 2001/133388; G02F 2001/136218; G02F 2201/52; G02F 2202/28; H01L 27/323; H01L 27/3244; H01L 51/0096; H01L 51/5281; H01L 51/5284; H01L 2251/5338; H04M 1/0202; H04M 1/0266; H04M 1/0268; H04M 2255/04; H04M 1/26; B32B 2255/04; B32B 2255/26; B32B 2260/025; B32B 2264/0214; B32B 2264/10; B32B 2264/102; B32B 2264/12; B32B 2307/40; B32B 2307/4023; B32B 2307/41; B32B 2307/412; B32B 3/18; H03K 2217/96031; H04N 5/2251; H04N 5/2253; H05B 33/0896; C23C 14/027
USPC .......... 359/609; 345/104, 173, 177, 204, 82, 345/110, 12, 139, 158; 427/162; 445/24; 178/18.03, 18.6; 257/40
See application file for complete search history.

(56) References Cited

U.S. PATENT DOCUMENTS

| 8,755,010 | B2 | 6/2014 | Yang et al. | |
|---|---|---|---|---|
| 9,066,380 | B2 | 6/2015 | Cho et al. | |
| 2007/0222922 | A1 | 9/2007 | Jin et al. | |
| 2013/0128193 | A1* | 5/2013 | Yang | G02F 1/133502 349/106 |
| 2013/0189491 | A1* | 7/2013 | Lai | G02B 1/10 428/172 |
| 2013/0265521 | A1* | 10/2013 | Chen | G02F 1/133502 349/61 |
| 2014/0184057 | A1* | 7/2014 | Kim | G06F 1/1637 313/504 |
| 2014/0368757 | A1* | 12/2014 | Chen | H03K 17/9622 349/12 |
| 2015/0301652 | A1* | 10/2015 | Yang | G06F 3/044 345/174 |
| 2016/0035759 | A1* | 2/2016 | Kwon | H01L 27/1244 257/40 |

* cited by examiner

ELECTRONIC DEVICE WITH LOW REFLECTANCE AND COLOR MATCHED DISPLAY BORDER

This application claims the benefit of provisional patent application No. 62/209,023 filed on Aug. 24, 2015, which is hereby incorporated by reference herein in its entirety.

BACKGROUND

This relates generally to electronic devices, and, more particularly, to electronic devices with displays.

Electronic devices such as laptop computers, cellular telephones, and other equipment are often provided with displays. Displays contain arrays of pixels that present images to a user. The border of a display may be covered with an opaque masking material such as black ink to hide internal component in the display from view.

Challenges can arise in forming electronic devices with displays. If care is not taken, the black ink in an opaque display border may be overly reflective or may have an unwanted color. These issues may detract from the appearance of a display and an electronic device in which the display is mounted.

It would be desirable to be able to provide improved border structures for electronic device displays.

SUMMARY

An electronic device may be provided with a housing and a display mounted in the housing. An array of pixels may display images through a transparent display layer in an active area of the display. An inactive area may border the active area.

An opaque masking material may be formed in the inactive border area. The opaque masking layer may include particles such as carbon black particles to provide the opaque masking layer with a dark appearance. The color of the opaque masking layer may be adjusted by incorporating additional particles such as titanium oxide particles. Particle size for the carbon black particles and the index of refraction of the opaque masking layer may be adjusted to reduce reflectance in the inactive border area.

A transparent conductive layer may be supported by the transparent display layer. Index-of-refraction matching layers may be interposed between the transparent conductive layer and the transparent display layer. The opaque masking layer may be interposed between the matching layers in the inactive border area, so that some of the index-of-refraction matching material lies between the opaque masking layer and the transparent display layer to help adjust reflectance and color for the opaque masking layer.

DETAILED DESCRIPTION

Figure 1:
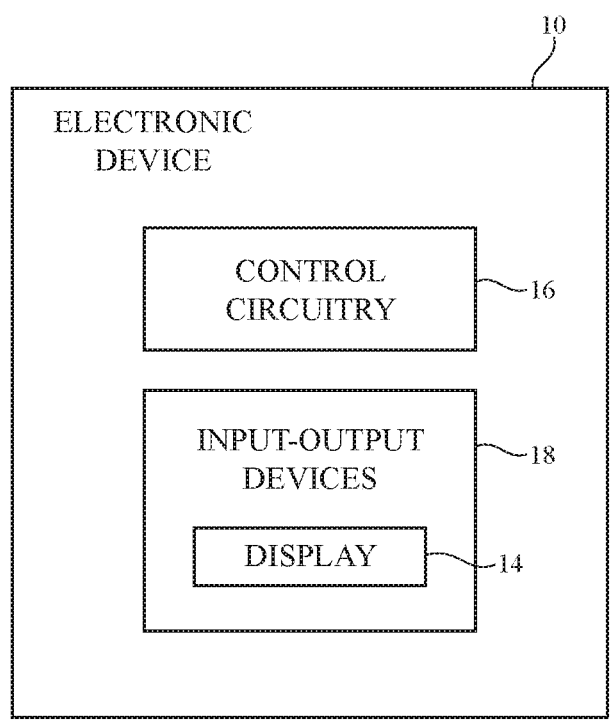
FIG. 1 is a schematic diagram of an illustrative electronic device having a display in accordance with an embodiment.

An illustrative electronic device of the type that may be provided with a display having an opaque border is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 18 may be used to allow data to be supplied to device 10 and to allow data to be provided from device 10 to external devices. Input-output devices 18 may include buttons, joysticks, scrolling wheels, touch pads, key pads, keyboards, microphones, speakers, tone generators, vibrators, cameras, light-emitting diodes and other status indicators, data ports, etc. Input-output devices 18 may include sensors such as an ambient light sensor, a capacitive proximity sensor, a light-based proximity sensor, a magnetic sensor, an accelerometer, a force sensor, a touch sensor, a temperature sensor, a pressure sensor, a compass, a microphone or other sound sensor, or other sensors. A user can control the operation of device 10 by supplying commands through input-output devices 18 and may receive status information and other output from device 10 using the output resources of input-output devices 18.

Input-output devices 18 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. Display 14 may be an organic light-emitting diode display or other light-emitting diode display, a liquid crystal display, a plasma display, an electrowetting display, an electrophoretic display, or other suitable display.

Figure 2:
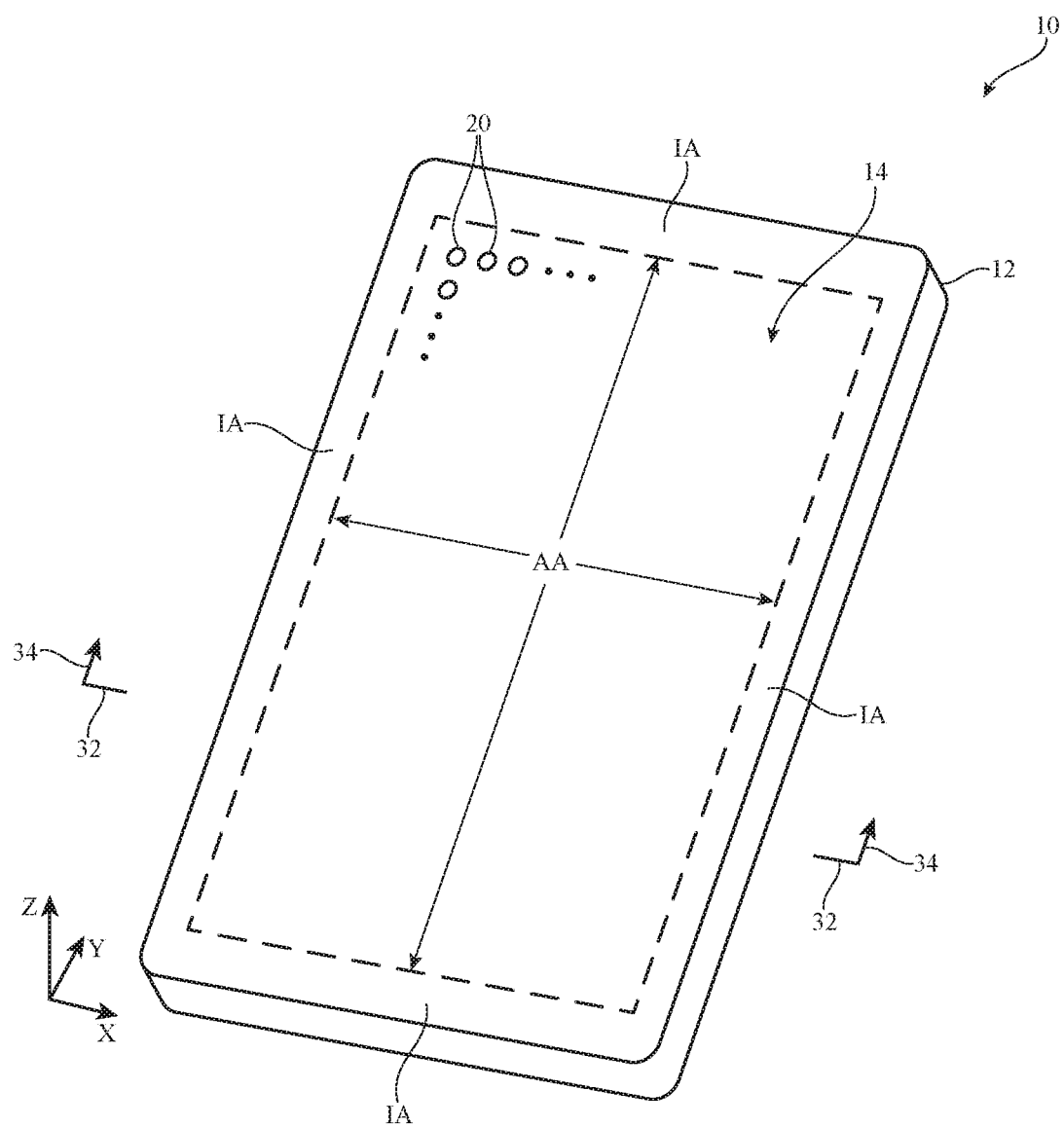
FIG. 2 is a perspective view of an illustrative device having an active display area surrounded by an inactive border in accordance with an embodiment.
Figure 3:
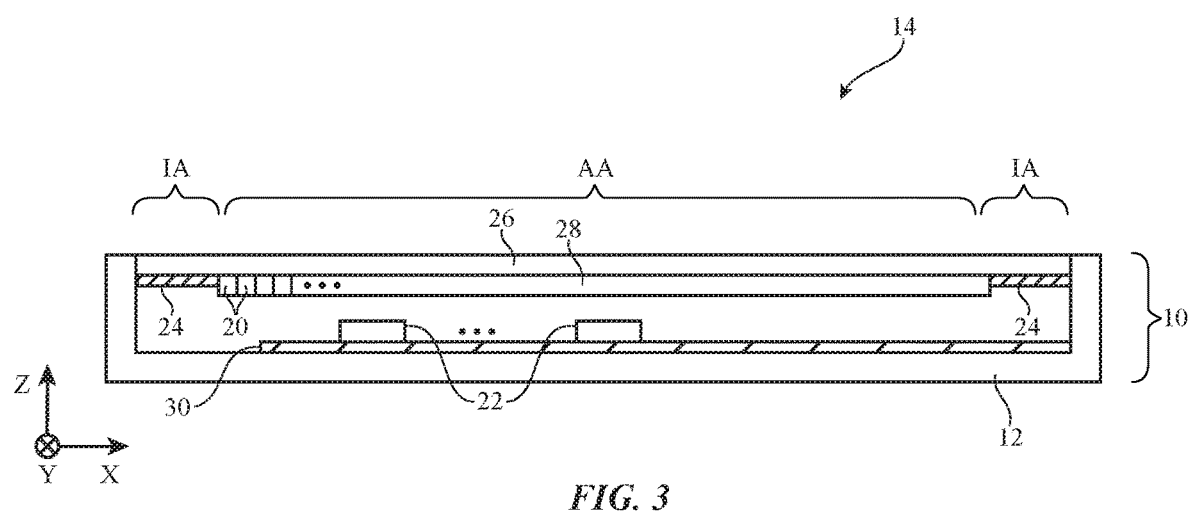
FIG. 3 is a cross-sectional side view of an illustrative electronic device having a display in accordance with an embodiment.

Display 14 may include an array of pixels surrounded by an inactive border. A perspective view of electronic device 10 in an illustrative configuration in which display 14 has an inactive border is shown in FIG. 2. As shown in FIG. 2, display 14 may include an array of pixels such as pixels 20. Pixels 20 may be organized in rows and columns and may be used in displaying images for a user in active area AA of display 14. Inactive border area IA of display 14 may run along one or more of the edges of active area AA. In the example of FIG. 2, inactive area IA runs along all four peripheral edges of rectangular active area AA and has a rectangular ring shape that surrounds active area AA.

Display 14 may be mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may have a single body (e.g., when device 10 is a cellular telephone, tablet computer, wristwatch device, etc.) or may have multiple body portions that are coupled by a hinge (e.g., in a laptop computer). Housing 12 may also have other shapes, if desired.

FIG. 2 is a cross-sectional side view of device 10 of FIG. 1 taken along line 32 and viewed in direction 34. As shown in FIG. 2, device 10 may include electrical components 22. Electrical components 22 may include integrated circuits, sensors, connectors, batteries, audio circuits, speakers, microphones, and other input-output devices and control circuitry. Electrical components 22 may be mounted on one or more substrates such as substrate 30. Substrates such as substrate 30 may be formed from plastic, glass, ceramic, other dielectric materials, printed circuits (e.g., rigid printed circuits formed from fiberglass-filled epoxy or other rigid printed circuit material and/or flexible printed circuits formed from flexible layers of polyimide or sheets of other polymer substrate materials), or other substrate material.

Display 14 may have an outermost layer such as display cover layer 26. Layer 26 may be formed from a transparent material that helps protect display 14 such as a layer of transparent plastic, clear glass, sapphire, or other protective display layer. Display module 28 (sometimes referred to as display structures or display layers) may contain pixels such as pixels 20. Pixels 20 may be arranged in a rectangular array of rows and columns or other suitable layouts to display images for a user of device 10. Pixels 20 produce images in active area AA of display 14. Inactive area IA of display 14 does not contain pixels 20 and does not produce images. To block potentially unsightly interior components from view in device 10, the underside of the edges of display cover layer 26 may be coated with a layer of opaque masking material 24. Opaque masking material 24 may have the shape of a rectangular ring that surrounds a central rectangular active area AA or may have other suitable shapes. Opaque masking material 24 may be formed from a layer of black or white ink, metal, opaque plastic, or other opaque materials. Configurations in which opaque masking material 24 is formed from black material such as a polymer containing carbon black particles may sometimes be described herein as an example.

Touch sensor structures for display 14 may be formed on the underside of display cover layer 26 and/or may be attached to display cover layer 26 using adhesive. Capacitive touch sensor structures may, as an example, be formed from an array of transparent conductive capacitive electrodes on display cover layer 26. Other types of touch sensor may be used in device 10, if desired. Configurations in which touch sensor structures are patterned on the inner surface of display cover layer 26 may sometimes be described herein as an example. Display layers 28 may be attached to display cover layer 26 (e.g., a touch sensor formed from patterned electrodes on layer 26) using adhesive or other attachment mechanisms.

Sunlight and other ambient light may reflect from display 14. Excessive light reflections may interfere with the ability of a user to view images on display 14 and may have an adverse impact on the appearance of opaque masking layer 24 in inactive area IA. It may therefore be desirable to minimize these reflections.

Reflections arise due to discontinuities in the indices of refraction of the layers that make up display 14 both in active area AA and in inactive area IA. To reduce reflections in both active area AA and in inactive area IA, index-of-refraction matching layer structures of the type shown in FIGS. 4 and 5 may be used.

Figure 4:
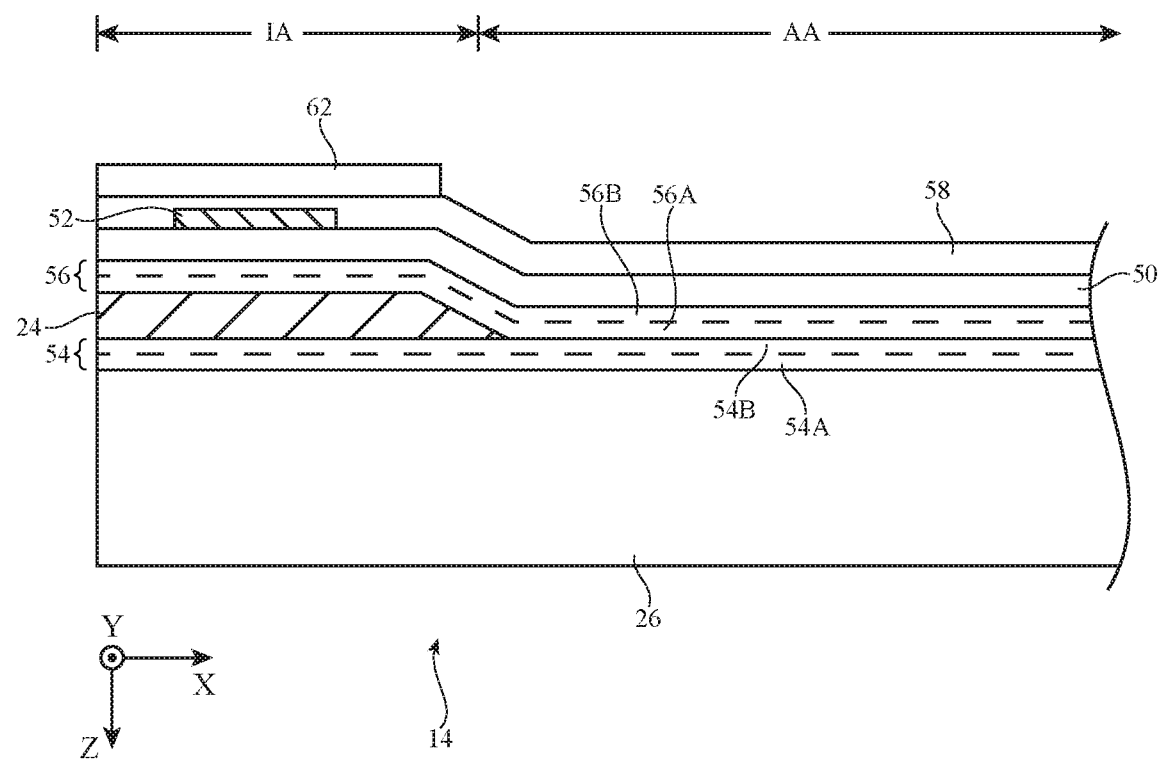
FIGS. 4 and 5 are cross-sectional side views of inactive border portions of displays in accordance with embodiments.

Consider, as an example, the arrangement of FIG. 4. As shown in FIG. 4, display 14 may include display cover layer 26. Display module 28 (not shown in FIG. 4) may be attached to the inner surface of display cover layer 26 in active area AA (e.g., using adhesive).

Touch sensor structures for a capacitive touch sensor in device 10 (e.g., touch sensor electrodes) may be formed from patterned areas of transparent conductive layer 50. Transparent conductive layer 50 may be formed from a conductive material such as indium tin oxide (as an example). Metal traces 52 may be formed in inactive area IA to from electrical connections to the electrodes of layer 50. If desired, display driver circuitry and other components for display 14 may be formed in inactive area IA. The presence of opaque masking layer 24 in area IA may help prevent a viewer from viewing display driver circuitry and other internal device components through inactive area IA of display cover layer 26.

The index of refraction of layer 26 may differ from the index of refraction of layer 50. Similarly, the index of refraction of layer 50 may differ from the index of refraction of the display module layers attached to the inner surface of layer 50 in active area AA. As an example, the index of refraction of layer 50 may be about 1.9, whereas the indices of refraction of layer 26 and the structures of display module 28 may be about 1.5. The index of refraction of opaque masking material layer 24 may be about 1.6-1.7 or, in some configurations, may be less than 1.6.

To help reduce reflections from index-of-refraction discontinuities in display 14, display 14 may incorporate one or more index-of-refraction matching layers such as layers 54, 56, and 58. The presence of index matching layers 54, 56, and 58 may help reduce reflections from the interface between layer 50 and adjacent layers with disparate index-of-refraction values. In the arrangement of FIG. 4, at least some index matching material (e.g., a portion of index matching layer 54 in inactive area IA) is interposed between masking layer 24 and display cover layer 26 and can help reduce reflections from masking layer 24 in inactive area IA. The thicknesses of layers 54, 56, and 58 (e.g., thickness of about 5 nm to 5 microns) and the index-of-refraction values of layers 54, 56, and 58 (e.g., index values of about 1.5 to 2.5) may be selected to minimize reflections from display 14 at visible light wavelengths and viewing angles of interest (e.g., viewing angles of 0-70°, viewing angles of above 30°, viewing angles of less than 90°, or other suitable angles).

Index matching layers 54, 56, and 58 may be formed from organic and/or inorganic materials. As an example, index matching layers 54, 56, and 58 may be formed from inorganic layers of material such as oxides, nitrides, oxynitrides, silicon oxide, silicon nitride, silicon oxynitride, metal oxides, niobium oxide (e.g., $Nb_2O_5$), titanium nitride, zirconium oxide, titanium oxide, tantalum oxide, aluminum oxide, germanium oxide, mica, etc. If desired, layers 54, 56, and 58 may be formed by incorporating nanoparticles of these inorganic materials and/or other materials into a polymer binder. Layers 54, 56, and 58 may be formed using gravure coating, spin coating, slit coating, spray coating, inkjet coating, or other coating techniques (e.g., other coating techniques suitable for depositing polymer coating layers and/or polymer layers that include inorganic nanoparticles). Inorganic materials for layers 54, 56, and 58 may be deposited using sputtering, evaporation, or other techniques. As one example, layers 54 and 56 may be formed by sputter deposition of inorganic materials and layer 58 may be a wet coated polymer with embedded nanoparticles.

Layers 54, 56, and 58 may each be formed from a single layer of material or may be formed from two or more layers of material. As an example, layer 54 may be formed from a first layer such as layer 54A (e.g., a niobium oxide layer or other suitable layer) and a second layer such as layer 54B (e.g., a silicon oxide layer or other suitable layer) and layer 56 may be formed from a first layer such as layer 56A (e.g., a silicon oxide layer or other suitable layer) and a second layer such as layer 56B (e.g., a niobium oxide layer or other suitable layer). As another example, layer 54 may be formed from a single higher-index layer (e.g., a niobium oxide layer of 10 nm in thickness or other suitable layer) and layer 56 may be formed from a single lower-index layer (e.g., a silicon oxide layer of 35 nm in thickness or other suitable layer). Other combinations of materials may be used in forming layers 54 and 56, if desired. Optional passivation layer 62 may be used to help protect metal layer 52. Layer 62 may be formed from a polymer, from an inorganic material such as silicon oxide, or other hard dielectric.

With the illustrative configuration of FIG. 4, the layer of index matching material between layer 50 and substrate 26 in active area AA includes at least two sublayers: layer 54 and layer 56. In inactive area IA, this layer of index matching material is split into two parts: layer 54 is formed on one side of layer 24 and layer 56 is formed on an opposing side of layer 24. Layer 54 is interposed between substrate 26 and layer 24 and helps reduce reflections from layer 24 in inactive area IA while also helping to match the color of layer 24 in inactive area IA to the color of display 14 in active area AA. If desired, the properties of layer 54 in inactive area IA may be selected to form an antireflection coating in inactive area IA, to achieve color stability at one or more different viewing angles, to form infrared cut and/or ultraviolet light cut filters in inactive area IA, or to form other desired optical structures overlapping layer 24. At the same time, the properties of layer 54, 56, and 58 in active area AA can be selected to adjust reflections, color performance at one or more viewing angles, to form infrared cut and/or ultraviolet light cut filters in active area AA, etc.

Figure 5:
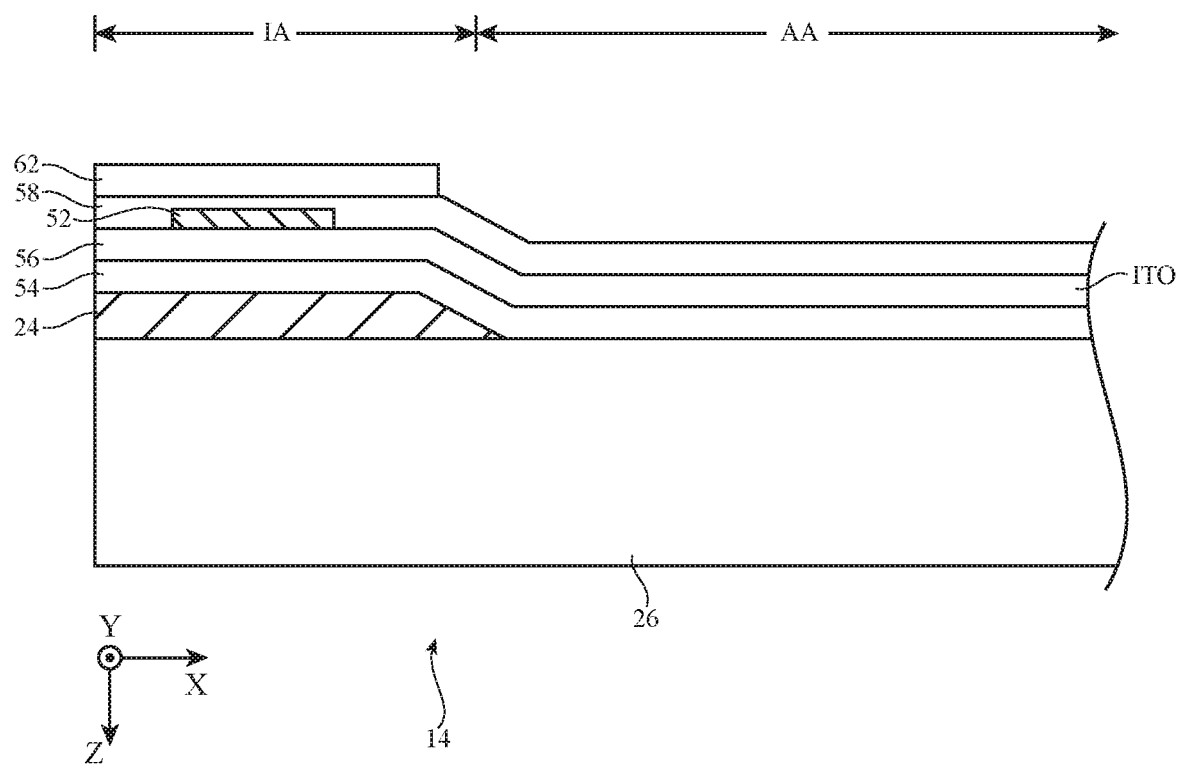

In the illustrative configuration of FIG. 5, index matching layers 54 and 56 are formed on the inner side of layer 24, so that layer 24 is interposed between layer 54 and substrate 26 in inactive area IA. To reduce reflections from layer 24 in inactive area IA, the material used to form layer 24 may be configured to have an index of refraction close to that of substrate 26. As an example, if the index of refraction of layer 26 is 1.5, the index of refraction of layer 24 may be 1.5 to 1.6, may be 1.5 to 1.55, may be less than 1.7, less than 1.65, less than 1.6, less than 1.55, or other suitable value. The difference between the index of refraction of layer 24 and layer 26 may be less than 10%, less than 2%, less than 5%, or less than 1% (as examples).

Figure 6:
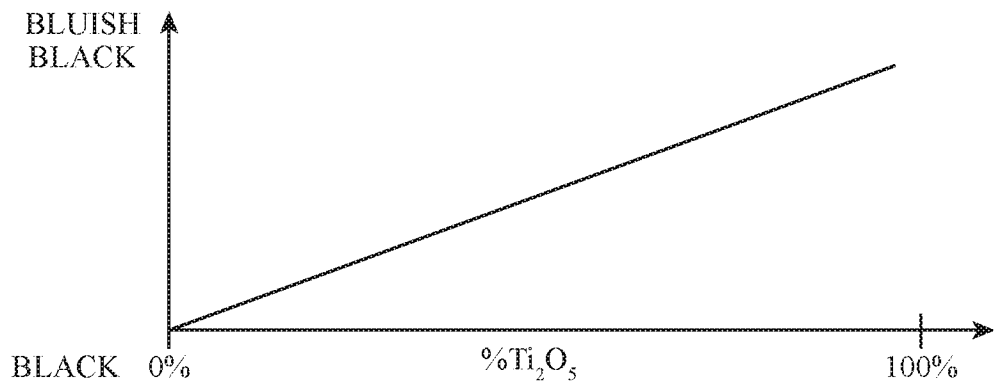
FIG. 6 is a graph showing how the formulation of an opaque masking layer material can be adjusted to adjust masking layer color in accordance with an embodiment.

It may be desirable for layer 24 to have a bluish black appearance. A material such as titanium oxide may be incorporated into layer 24 to adjust the appearance of layer 24. Layer 24 may be formed from a polymer binder. A mixture of two different types of particles may be used in adjusting the color of layer 24. With one illustrative configuration, layer 24 is a polymer layer that includes a mixture of black particles such as carbon black particles and bluish black particles such as titanium oxide particles. FIG. 6 is a graph showing how the color of layer 24 may be adjusted between black and bluish black by adjusting the fraction by weight of titanium oxide particles relative to carbon black particles in a polymer binder. At titanium oxide weight fractions of about 5-20%, layer 24 may have an attractive bluish black appearance. Other mixtures of titanium oxide and carbon black particles in a polymer binder forming layer 24 may be used, if desired.

Figure 7:
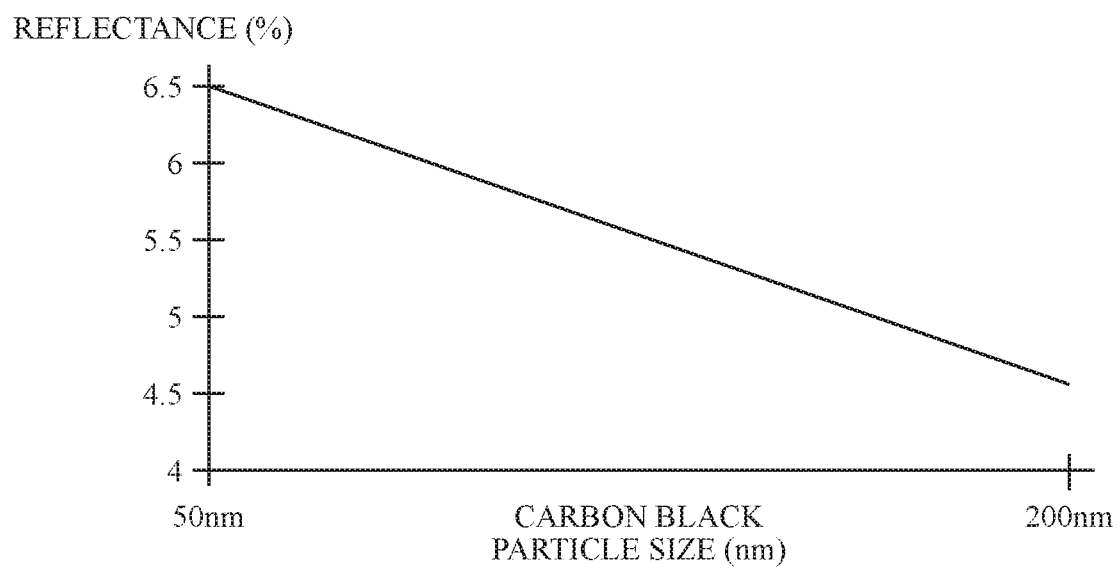
FIG. 7 is a graph showing how particle size (particle diameter) in an opaque masking layer can be adjusted to control reflectance in accordance with an embodiment.

To reduce reflectance, it may be desirable to enhance the particle size (particle diameter) of the carbon black particles in layer 24. Particles that are about 50 nm in size may result in a relatively high reflectance (e.g., 6.5%, as shown in the graph of FIG. 7), whereas larger particles (e.g., particles that are 150-250 nm in size, that are about 200 nm in size, that are more than 225 nm in size, that have diameters of at least 150 nm, etc.) may reduce the reflectance of layer 24 (e.g., to about 4.5%, as shown in the graph of FIG. 7, which is 0.5% above the expected reflectance of layer 24 due to the presence of overlapping glass layer 26).

If desired, layer 24 may be formed from a low index of refraction material (e.g., less than 1.6, less than 1.55, etc.), may use opaque particles formed from a mixture of carbon black and other pigments such as titanium oxide as described in connection with FIG. 6, may use an enhanced carbon black particle size (e.g., diameters of more than 150 nm or other suitable diameter), and/or may use a split index-matching-layer arrangement of the type described in connection with FIG. 4. Moreover, layers 54 and 56 may, if desired, both be formed between layer 24 and layer 26 to help reduce reflections and achieve a desired color in inactive area IA. The arrangements described in connection with FIGS. 4, 5, 6, and 7 are merely illustrative.

The foregoing is merely illustrative and various modifications can be made by those skilled in the art without departing from the scope and spirit of the described embodiments. The foregoing embodiments may be implemented individually or in any combination.

What is claimed is:

1. A display having an active area and an inactive border area adjacent to the active area, comprising:
   pixels that display images in the active area;
   a transparent display layer through which light from the pixels passes;
   a layer of opaque masking material on the transparent display layer in the inactive border area;
   a transparent conductive layer on the transparent display layer;
   a first index-of-refraction matching layer that is interposed between the transparent conductive layer and the transparent display layer in the active area and that has a portion in the inactive border area, and wherein the first index-of-refraction matching layer is interposed between the transparent display layer and the pixels;

a second index-of-refraction matching layer that is interposed between the transparent conductive layer and the transparent display layer in the active area and that has a portion in the inactive border area, wherein the layer of opaque masking material is interposed between the portion of the first index-of-refraction matching layer in the inactive border area and the portion of the second index-of-refraction matching layer in the inactive border area and wherein the second index-of-refraction matching layer is interposed between the transparent display layer and the pixels; and a third index-of-refraction matching layer, wherein the transparent conductive layer is interposed between the third index-of-refraction matching layer and the second index-of-refraction matching layer.

2. The display defined in claim 1 wherein the first index-of-refraction matching layer comprises niobium oxide.

3. The display defined in claim 2 wherein the second index-of-refraction matching layer comprises silicon oxide.

4. The display defined in claim 1 wherein the opaque masking layer comprises a polymer containing carbon black particles.

5. The display defined in claim 4 wherein the carbon black particles are at least 150 nm in diameter and wherein the opaque masking layer comprises titanium oxide.

6. The display defined in claim 5 wherein the opaque masking layer has an index of refraction of less than 1.6.

7. The display defined in claim 5 wherein the transparent conductive layer comprises indium tin oxide.

8. A display having an active area and an inactive border area surrounding the active area, comprising:

pixels that displays images in the active area;

a transparent display layer through which light from the pixels passes;

a layer of opaque masking material in the inactive border area;

a transparent conductive layer on the transparent display layer;

a first index-of-refraction matching layer that is interposed between the transparent conductive layer and the transparent display layer in the active area and that has a portion in the inactive border area; and a second index-of-refraction matching layer that is interposed between the transparent conductive layer and the transparent display layer in the active area and that has a portion in the inactive border area, wherein the layer of opaque masking material is interposed between the portion of the first index-of-refraction matching layer in the inactive border area and the transparent display layer in the inactive border area, wherein the portion of the first index-of-refraction matching layer in the inactive border area layer is interposed between the portion of the second index-of-refraction matching layer in the inactive border area and the layer of opaque masking material, and wherein the opaque masking layer is a layer of polymer containing carbon black particles and titanium oxide particles.

9. The display defined in claim 8 wherein the carbon black particles have diameters of at least 150 nm.

10. The display defined in claim 9 wherein the opaque masking layer has an index of refraction of less than 1.6.

11. The display defined in claim 10 wherein the titanium oxide particles are present in the polymer at a concentration of between 5% and 20% by weight relative to the carbon black particles.

12. An electronic device, comprising:

a housing;

a display mounted in the housing, wherein the display has an active area and an inactive area, wherein the display has a display layer and has pixels that display images through the display layer in the active area;

a layer of opaque masking material on the display layer in the inactive area;

a touch sensor electrode supported by the display layer, wherein the touch sensor electrode has a first portion in the active area and a second portion in the inactive area;

a first index-of-refraction matching layer that is interposed between the first portion of the touch sensor electrode and the display layer in the active area and that has a portion in the inactive area that is interposed between the display layer and the layer of opaque masking material; and a second index-of-refraction matching layer that is interposed between the first portion of the touch sensor electrode and the display layer in the active area and that has a portion in the inactive area that is interposed between the layer of opaque masking material and the second portion of the touch sensor electrode, wherein the layer of opaque masking material is interposed between the portion of the first index-of-refraction matching layer in the inactive area and the portion of the second index-of-refraction matching layer in the inactive area.

13. The electronic device defined in claim 12, further comprising:

an additional index-of-refraction matching layer, wherein the touch sensor electrode is interposed between the additional index-of-refraction matching layer and the second index-of-refraction matching layer.

14. The display defined in claim 13 wherein the first index-of-refraction matching layer comprises first and second sublayers of different materials.

15. The display defined in claim 14 wherein the second index-of-refraction matching layer comprises at least two sublayers of different materials.

16. The display defined in claim 12 wherein the touch sensor electrode comprises indium tin oxide and wherein the first index-of-refraction matching layer comprises an inorganic material.

17. The display defined in claim 16 wherein the inorganic material comprises niobium oxide.

18. The display defined in claim 17 wherein the second index-of-refraction matching layer comprises silicon oxide, wherein the opaque masking material comprises carbon black particles, wherein the carbon black particles have diameters of at least 150 nm, and wherein the opaque masking material further comprises titanium oxide.

19. The display defined in claim 12 wherein the first index-of-refraction matching layer comprises an inorganic material.

20. The display defined in claim 1, wherein the transparent display layer comprises a display cover layer that is formed from a material selected from the group consisting of: glass, plastic, and sapphire.

* * * * *

UNITED STATES PATENT AND TRADEMARK OFFICE
CERTIFICATE OF CORRECTION

PATENT NO. : 10,754,066 B2  
APPLICATION NO. : 14/884677  
DATED : August 25, 2020  
INVENTOR(S) : Chun-Hao Tung et al.

Page 1 of 1

It is certified that error appears in the above-identified patent and that said Letters Patent is hereby corrected as shown below:

In the Claims

Column 7, Line 37, "pixels that displays images" should read -- pixels that display images --

Signed and Sealed this  
Ninth Day of February, 2021

Drew Hirshfeld  
*Performing the Functions and Duties of the*  
*Under Secretary of Commerce for Intellectual Property and*  
*Director of the United States Patent and Trademark Office*